(12) United States Patent
Harris

(10) Patent No.: US 9,533,379 B2
(45) Date of Patent: Jan. 3, 2017

(54) PHOSPHOROUS-COPPER BASE BRAZING ALLOY

(75) Inventor: Joseph W. Harris, Cincinnati, OH (US)

(73) Assignee: LINCOLN GLOBAL, INC., City of Industry, CA (US)

( * ) Notice: Subject to any disclaimer, the term of this patent is extended or adjusted under 35 U.S.C. 154(b) by 0 days.

(21) Appl. No.: 10/628,651

(22) Filed: Jul. 28, 2003

(65) Prior Publication Data

US 2005/0249629 A1 Nov. 10, 2005

Related U.S. Application Data

(63) Continuation-in-part of application No. 10/226,672, filed on Aug. 23, 2002, now abandoned.

(60) Provisional application No. 60/452,255, filed on Mar. 5, 2003.

(51) Int. Cl.
*B23K 35/30* (2006.01)
*C22C 9/02* (2006.01)

(52) U.S. Cl.
CPC .................................. *B23K 35/302* (2013.01)

(58) Field of Classification Search
CPC .................................................. B23K 35/302
USPC ............................ 148/400, 433, 22; 420/472
See application file for complete search history.

(56) References Cited

U.S. PATENT DOCUMENTS

| | | | |
|---|---|---|---|
| 1,882,917 A | 10/1932 | Ripley | |
| 1,904,389 A | 4/1933 | Smith | |
| 1,921,416 A | 8/1933 | Leach | 75/1 |
| 2,058,884 A | 10/1936 | Jennison | 113/112 |
| 2,139,730 A | 12/1938 | Dawson | 75/160 |
| 2,161,057 A * | 6/1939 | Kalischer | 420/499 |
| 2,390,775 A | 12/1945 | Christ | 75/153 |
| 2,554,233 A | 5/1951 | Ballentine et al. | 75/153 |
| 3,428,442 A * | 2/1969 | Yurasko, Jr. | 428/570 |
| 3,674,471 A * | 7/1972 | Joseph | 420/472 |
| 4,011,056 A | 3/1977 | Steine et al. | 29/199 |
| 4,180,616 A * | 12/1979 | Lovering et al. | 428/389 |
| 4,214,904 A | 7/1980 | Kitchen et al. | 75/165 |
| 4,355,084 A | 10/1982 | Kitchen | 428/672 |
| 4,499,360 A | 2/1985 | Rottenbacher | 219/85 H |
| 4,517,157 A | 5/1985 | Coad | 420/490 |
| 4,587,097 A | 5/1986 | Rabinkin et al. | 420/473 |
| 4,758,407 A | 7/1988 | Ballentine et al. | 420/560 |
| 5,066,456 A | 11/1991 | Ballentine et al. | 420/472 |
| 5,378,294 A | 1/1995 | Rissanen | |
| 5,542,993 A | 8/1996 | Rabinkin | 148/528 |
| RE35,521 E | 5/1997 | Mizuhara | 420/489 |
| 2,190,267 A1 | 10/2003 | Light | 113/112 |

FOREIGN PATENT DOCUMENTS

| | | | |
|---|---|---|---|
| CN | 1060052 | 1/1992 | |
| DE | 4118217 A1 | 1/1992 | |
| EP | 0103805 | 3/1984 | ............. B23K 35/30 |
| EP | 465861 * | 1/1992 | |
| GB | 2168078 | 6/1986 | ............... C22C 9/02 |
| JP | 55-11164 | 7/1978 | |
| JP | 09070686 | 3/1997 | ............ B23K 35/22 |
| JP | 2003-82424 | 3/2003 | ............... C22C 9/02 |
| PL | 143102 | 1/1988 | |
| PL | 149319 | 2/1990 | |
| SU | 492366 | 11/1975 | |
| SU | 1706816 * | 1/1992 | |
| SU | 1708903 | 1/1992 | |

OTHER PUBLICATIONS

A. Datta et al. *Rapidly Solidified Copper-Phosphorus Base Brazing Foils*, Welding Journal, vol. 63, No. 10, XP002264133, 1984, pp. 14-21.
Smirnov, V. et al. *Brazing Filler for Copper and Its Alloys*, Database CA 'Online!, Chemical Abstracts Service, Columbus, OH, retrieved from STN, XP002264134, 1992, abstract only SU1706816.
USPTO, "Examination Guidelines Update: Developments in the Obviousness Inquiry After KSR v. Teleflex," 75 Fed. Reg. 53,643-53,660 (Sep. 1, 2010).

\* cited by examiner

*Primary Examiner* — Sikyin Ip
(74) *Attorney, Agent, or Firm* — Perkins Coie LLP

(57) ABSTRACT

A solid phos-copper base brazing alloy component for forming a brazed joint with a raised shoulder, little to no black oxide, and improved corrosion resistance. The brazing components of the present invention are made of an alloy having a liquidus temperature above 840° F. and contain of about 4-7% phosphorus, about 2-8% tin, about 2% antimony, up to about 3% nickel, 0.1 to about 3% silicon, up to about 3% manganese, with the balance being copper.

4 Claims, 2 Drawing Sheets

PHOSPHOROUS-COPPER BASE BRAZING ALLOY

CROSS REFERENCE TO RELATED APPLICATIONS

Pursuant to 37 C.F.R. §1.78(a)(4), this application claims the benefit of and priority to prior filed Provisional Application Ser. No. 60/452,255, filed Mar. 5, 2003, and this application is a continuation-in-part of commonly owned, U.S. patent application Ser. No. 10/226,672, filed Aug. 23, 2002, now abandoned, the disclosures of which are incorporated by reference herein in their entirety.

FIELD OF THE INVENTION

This invention relates to a solid copper brazing component and method for forming a brazed joint, and in particular, a brazing component for joining copper and copper alloys.

BACKGROUND OF THE INVENTION

Copper and copper alloys have been brazed successfully for many years with metals comprising the phosphorus-copper alloys, also known as phos-copper alloys. Silver is often added to the base metals to accomplish special features for a wide variety of applications. These alloys are generally known as silver-phos-copper alloys. Silver brazing alloys, composed primarily of silver, copper, zinc, tin, nickel, manganese, and cadmium, are used to braze ferrous and non-ferrous metals and alloys. These silver brazing alloys are designed to work at low temperatures and to provide strong, ductile joints.

Additions of other elements, such as tin, antimony, nickel or silver, to phos-copper and silver-phos-copper alloys have been made in an effort to lower the melting range temperatures or to reduce the phosphorus content to increase ductility. For example, U.S. Pat. No. 5,066,456 discloses that the addition of tin and antimony up to six percent each to a phos-copper based alloy lowers brazing temperatures.

Air conditioning coils, heat exchangers, water coolers and other copper coils are manufactured by connecting copper tubing and fittings by brazing with phos-copper or silver-phos-copper brazing alloys. These alloys produce strong, ductile brazes, but the industry has long experienced a relatively high percentage of leaks after brazing, particularly with BCuP-2 alloys. Most leaks are caught on the production floor during testing and are repaired. This double work of brazing and testing is very costly. More damaging, very tiny leaks can evade factory testing and end up as warranty work in the field, which is both expensive and damaging to the company's brand image.

The phos-copper alloys now on the market all range within a solidus temperature of 1310° F. to a liquidus temperature of 1500° F. Alloys of even higher phosphorus content, up to 8%, are now in use to enhance productivity because of their lower operating temperature cost considerations. The non-silver alloys in this group are the most commonly used in industry and contain 7% to 7.4% phosphorus, the balance being copper. The fact that these phos-copper alloys flow and join very well is problematic in that they also flow very thinly. Torch and furnace brazing is performed as rapidly as possible to achieve good productivity. While these alloys are quick to braze, they are difficult to observe for soundness. The entire 360° of the brazed joint must be carefully viewed by the operator, for it is here that a correction, if needed, should be made. These thin-flowing alloys produce only a very small cap, or shoulder, around the pipe at the fitting junction. The alloys are thin-flowing in that they flow like a heavy coating of paint, instead of more thickly as in a putty used to seal a ⅛" crack.

Even a skilled brazer cannot tell 100% of the time that he has a totally leak-free connection by visually looking at his completed braze. In some places on a given braze connection, the brazing alloy can be seen to be in place as a shoulder between the two parts, while in other places the alloy drops in the adjoining area (the capillary) without forming any noticeable shoulder. When viewing this very closely, the operator can often see that the joint appears to be 100% sound, but he can't be certain of it. Most air conditioning companies submerge each copper coil, which comprises perhaps 100 brazes, into a water tank, and air pressure is added to this coil to determine if there are any leaks. Wherever leaks are found, brazing must be repeated.

The now-in-use phos-copper alloys, as described above, could be modified to form an advantageous cap by lowering the phosphorus content significantly. However, doing so is not feasible because the liquidus temperature rises to a point of endangering the copper being brazed. It is noteworthy that silver in the range of 6-15%, when added to the phos-copper alloys described above, lowers the solidus temperature to 1190° F., allows the phosphorus contents to be reduced as much as 2%, allows the alloy to flow in a much thicker manner, and effects a noticeable cap or shoulder to the brazed area. The popular 15% silver-phos-copper alloy has the consistency of hot taffy when hot enough to braze, and easily forms a large cap or shoulder at the joint area. This visible fillet is quickly seen by the operator and any omission in the braze can be remedied. However, the addition of silver is quite expensive.

Another serious deterrent to being able to observe the quality of copper tubing brazed with phos-copper or silver-phos-copper brazing alloys is the formation of a black oxide that is formed on the actual braze surface and on the adjacent copper pipe. Because the braze and the copper pipe all turn black, it is difficult to closely inspect the actual braze.

In addition to the initial soundness of the brazed joint, the corrosion resistance of the joint is of great importance. Brazed parts are used in corrosive environments of varying degree, for example, the marine environment, sewer treatment facilities and underground. The BCuP-5 alloy (80Cu-5P-15Ag) is typically used whenever corrosion is a significant factor. However, further improvement in corrosion resistance is desirable.

There is thus a need for a phos-copper base alloy system that brazes at low temperatures, forms a noticeable cap or shoulder to facilitate visual inspection, does not form black oxide to any extent that will obscure visual inspection, and provides high corrosion resistance.

SUMMARY OF THE INVENTION

The present invention provides a solid phos-copper base brazing alloy component suitable for forming a brazed joint with a raised shoulder and little to no black oxide, that is visually distinguishable from copper or copper alloy parts, and provides high corrosion resistance. The brazing filler metal of the present invention incorporates an advantageously low brazing temperature range and is both ductile, smooth and corrosion resistant. The brazing alloys of the present invention can be extruded into wire and optionally formed into various preforms or fabricated into strips or foil, thereby providing a solid brazing component suitable for numerous brazing applications, such as brazing large copper pipe fittings. To this end, a brazing alloy is cast and then fabricated into wire, strip, foil or preform. For example, a cast billet may be extruded into wire, which may be further formed into a preform. The component is made of an alloy having a liquidus temperature above 840° F. (449° C.) and which consists essentially of about 4% to about 9% phosphorus; about 0.1% to about 10% tin; about 0.1 to about 15% nickel; up to about 3% silicon; up to about 18% silver; up to about 4% antimony; up to about 3% manganese, and the balance copper. In exemplary embodiments, the alloy includes about 1% to about 18% silver and/or about 3% to about 10% nickel, and advantageously 5-8% nickel.

In another embodiment, the component is made of an alloy having a liquidus temperature above 840° F. and which consists essentially of about 4% to about 10% phosphorus; about 0.1% to about 8% tin; about 0.001% to about 3% silicon; up to about 18% silver; up to about 3% nickel; up to about 4% antimony; up to about 3% manganese, and the balance copper. In exemplary embodiments, the alloy includes about 0.1% to about 18% silver and/or about 0.1% to about 3% nickel.

The present invention further provides a method for forming a brazing component of the composition described above, wherein a molten alloy is continuously cast into a billet, which is then fabricated into a wire or thick strip. The wire may then be drawn to a desired diameter, and the strip may be rolled to a desired thickness or to a thin foil. The wire may also be further formed into a preform. To form a brazed joint, the solid brazing component is placed between two metal parts, such as copper tubing, the component is heated to a temperature to melt at least a major portion of the brazing alloy, thereby causing it to wet and flow between the parts, and then the alloy is cooled. The brazing component of the present invention produces a substantial raised shoulder or cap about the brazed joint, which is a visible sign to the operator that the joint is sound.

The brazing component of the present invention further produces a brazed joint with little to no black oxide that can obscure the operator's view of the soundness of the joint. In addition, the combination of alloying elements significantly reduces the melting range of these brazing filler metals, thereby providing a cost savings by reducing the use of expensive fuel gases and the time required of the brazing process. The addition of nickel in combination with tin may further provide an increase in hardness and an improvement in corrosion resistance.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

DETAILED DESCRIPTION

Figure 1:
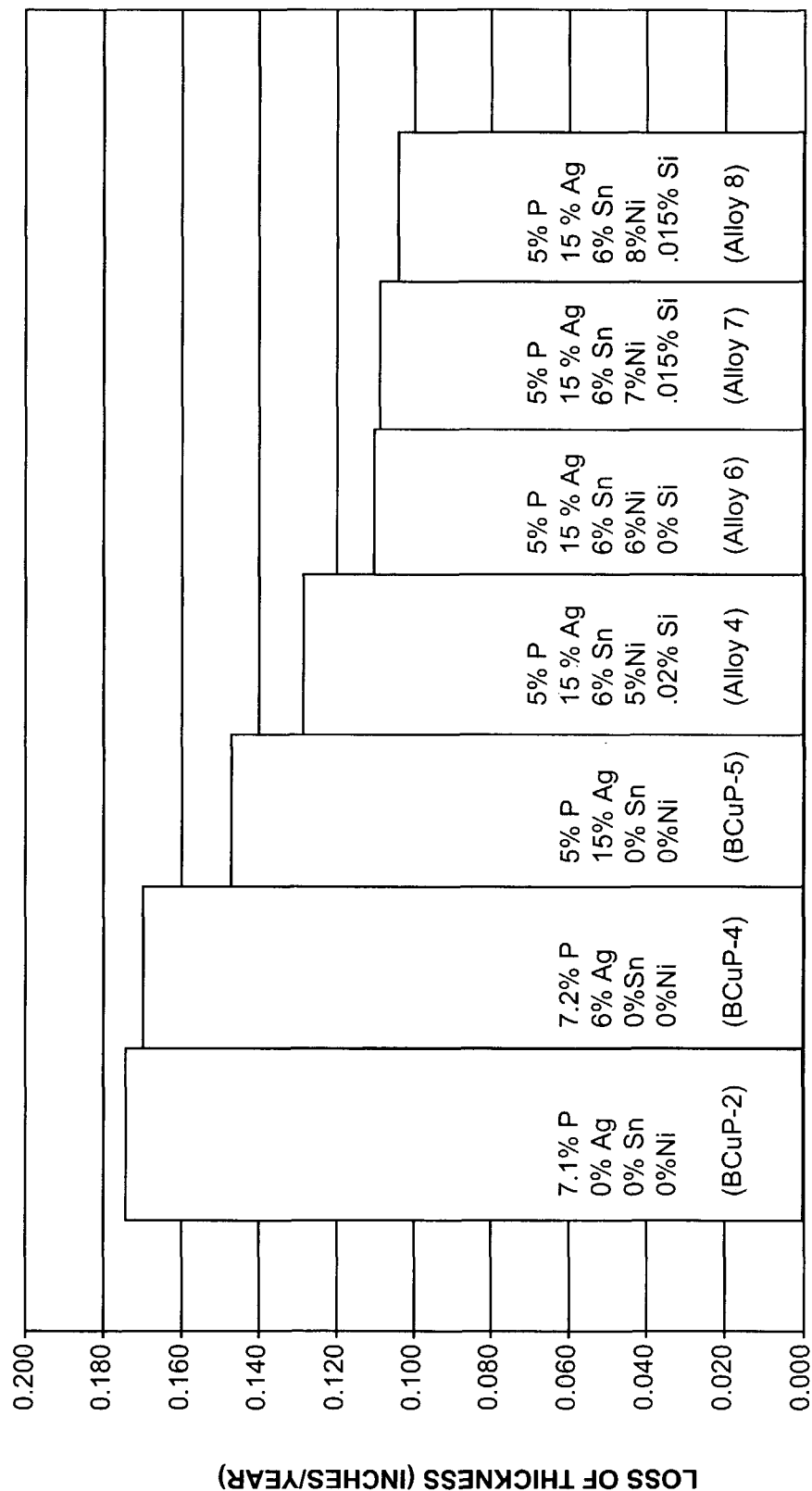
FIG. 1 is a graph depicting the improvement in corrosion resistance for silver-phos-copper alloys of the present invention containing 5-8% nickel in combination with tin, as compared to BCuP alloys of the prior art.

The present invention provides phos-copper base brazing alloys that are materially improved in their properties by the addition of specified amounts of tin and nickel, and further by specified additions of silicon and/or silver. The melting range can be lowered, narrowed or broadened. In other words, the specified alloy additions lower one or more of the liquidus, major thermal arrest (MTA) or solidus temperatures. As used herein, the liquidus temperature refers to that temperature at which the alloy is completely liquid, i.e. at which the alloy finishes melting upon heating. The solidus temperature refers to that temperature at which a metal is completely solid, i.e., at which the alloy begins to melt upon heating. Thus, the brazing temperature range extends from the solidus temperature to the liquidus temperature. The brazing temperature, or melting temperature at which the alloy wets and flows, is generally considered to be between the solidus and liquidus temperatures. Some alloys exhibit thermal arrests between the solidus and liquidus, which may be observed on the cooling curve for a given alloy, with the major thermal arrest (MTA) temperature indicating the melting temperature of a major portion of the alloy. For alloys that do exhibit a MTA, the brazing temperature is generally considered to be at or near the MTA. For alloys that do not exhibit a MTA, the brazing temperature (i.e., temperature at which a major portion of the alloy is melted) is generally considered to be at or near the liquidus temperature.

The alloys of the present invention form a large cap, or shoulder, during the brazing process that is clearly visible, and they do so at a brazing temperature that has not been possible with phos-copper brazing alloys in the past without the addition of silver to the composition of the alloys. In fact, the phos-copper base alloys of the present invention which include tin and nickel, and advantageously silicon, will form a cap or shoulder similar to or superior to silver-phos-copper alloys of the prior art, and will do so at lower brazing temperatures than the prior art silver-containing alloys, and will exhibit greater corrosion resistance. The phos-copper base alloys of the present invention which include silver, tin and nickel, and advantageously silicon, also form a cap or shoulder similar to or superior to silver-phos-copper alloys of the prior art and will do so at significantly lower brazing temperatures than the prior art silver-containing alloys, particularly for high silver contents, such as 6-18% and will exhibit greater corrosion resistance. The liquidus and MTA temperatures of brazing alloys of the present invention more closely represent the most important characteristic of where the alloy flows (the working temperature). The filler metal can readily fill loose connections and cap large copper fittings. Specific formulations of this alloy can accommodate near-eutectic melting characteristics to braze tight-fitting parts and conversely, to fill loose connections as large as 0.050".

The large caps formed by brazing with the phos-copper base alloy compositions of the present invention (without silver addition) are a bright tin or silver color, and their presence is easily seen. This is an advantage over the phos-copper alloys of the prior art that do not cap well and are black in color after brazing. The brazing torch operator has great difficulty viewing the previous copper brazes because the braze itself is black from oxide as is the copper adjacent to the braze. This can contribute to leaks in the manufacturing of such components as air conditioning copper coils, leaks that can be avoided by the operator's being able to see a bright metal braze (cap or seal) that is contiguous and complete. The phosphorus-tin-nickel-copper alloys and the phosphorus-tin-nickel-silicon-copper alloys of the present invention cause no blackening on the braze or on the adjacent copper.

To this end, a solid brazing component is provided as a strip, foil, wire or preform, wherein the brazing component has a liquidus temperature above 840° F., thus making the component suitable for brazing techniques. The brazing component is made of an alloy consisting essentially of, in weight percent, about 4-9% phosphorus, about 0.1-10% tin, and about 0.1-15% nickel. In all alloy examples provided herein, the balance of the composition is copper. Further, in all alloys described herein, all or a portion of the tin may be replaced by antimony, which serves the same or similar function in the alloy, but preferably the antimony content does not exceed about 4%, and the sum of tin and antimony does not exceed about 10% of the alloy composition. The presence of nickel in combination with tin results in a lowering of the solidus temperature, an increase in hardness, and an improvement in corrosion resistance. Advantageously, nickel is included in an amount of about 3-10%. It may be appreciated that as nickel content increases, fabrication becomes increasingly more difficult in proportion, namely extrusion and drawing into wire becomes more difficult. Thus, to optimize corrosion resistance and extrudability, the alloy advantageously includes about 5-8% Ni.

The alloys of the present invention may further include up to about 3% silicon, and advantageously include silicon in an amount of about 0.001-3%. In another exemplary embodiment of the present invention, the alloys may further include up to 18% silver, and advantageously contain silver in an amount of about 1-18%. In yet another exemplary embodiment of the present invention, the alloy includes both silver and silicon additions. All alloys of the present invention may further include up to about 3% manganese without departing from the scope of the present invention. Manganese is a known alloying addition for increasing the toughness and hardness of the brazing alloy. Further, alloys including impurity amounts of other elements are considered within the scope of the present invention. Impurities may be present by virtue of the raw materials used to make the alloys, and are to be distinguished from elements intentionally added to the alloy melt for the purpose of affecting the properties of the alloy.

As may be appreciated by one skilled in the art, variations in the amounts of each of the alloying elements, within the above-described ranges, will have an effect on the liquidus, MTA and solidus temperatures of the brazing alloy, as well as hardness and corrosion resistance. The following alloys are provided as exemplary, in that they achieve desirable liquidus, MTA, and/or solidus temperatures, achieve good corrosion resistance, form a substantial cap or shoulder, and produce little to no blackening on the braze or adjacent metal. In no way should the following recitations be considered to limit the scope of the present invention to the specific exemplary alloys. A first exemplary embodiment of a brazing component of the present invention is made of an alloy consisting essentially of, in weight percent: (a) about 4-9% phosphorus; (b) about 4-8% tin; (c) about 5-8% nickel, and the balance copper. Optional additional elements may include up to 3% silicon, up to 4% antimony, up to 18% silver and up to 3% manganese.

A second exemplary embodiment of a brazing component of the present invention is made of an alloy consisting essentially of, in weight percent: (a) about 4-9% phosphorus; (b) about 4-8% tin; (c) about 3-10% nickel, (d) about 2-18% silver, and the balance copper. Optional additional elements may include up to 3% silicon, up to 4% antimony and up to 3% manganese.

A third exemplary embodiment of a brazing component of the present invention is made of an alloy consisting essentially of, in weight percent: (a) about 4-7% phosphorus; (b) about 4-8% tin; (c) about 5-8% nickel; (d) about 6-15% silver; (e) about 0.001-1% silicon, and the balance copper. Optional additional elements may include up to 4% antimony and up to 3% manganese.

A fourth exemplary embodiment of a brazing component of the present invention is made of an alloy consisting essentially of, in weight percent: (a) about 5-6% phosphorus; (b) about 6-7% tin; (c) about 5-8% nickel, (d) about 6-10% silver, (e) about 0.015-0.02% silicon, and the balance copper. Optional additional elements may include up to 4% antimony and up to 3% manganese.

A fifth exemplary embodiment of a brazing component of the present invention is made of an alloy consisting essentially of, in weight percent: (a) about 5-6% phosphorus; (b) about 6-7% tin; (c) about 5-8% nickel; (d) about 15% silver; (e) about 0.015-0.02% silicon, and the balance copper. These alloys may exhibit a solidus temperature on the order of 1034-1056° F. and a liquidus temperature on the order of about 1404° F. or less, as well as a MTA on the order of 1205-1296° F. Optional additional elements may include up to 4% antimony and up to 3% manganese.

The above-described alloy components are added to a melt in desired amounts, and the resulting alloy melt is continuously cast into a billet. The billet is then extruded into a wire or rolled into strip or foil. The wire may be drawn one or more times to produce a desired wire diameter. If desired, the wire may be further formed into a preform.

A joint is brazed in accordance with the present invention by placing the solid brazing component having one of the compositions described above between two metal parts, heating the solid brazing component to melt at least a major portion of the alloy (i.e., heating to a brazing temperature at or near the MTA or liquidus temperature) to cause the alloy to wet and flow between the two metal parts, with flux if necessary, then cooling the alloy to form the brazed joint, whereby a raised cap is visible between the two metal parts, and the joint and adjacent metal parts are substantially free of black metal oxide. In one embodiment, the metal parts may be two copper or copper alloy parts and the brazed joint will be visually distinguishable from the parts, having a bright tin or silver color. The solid brazing components of the present invention are suitable for brazing a wide variety of parts of both simple and intricate shapes. For example, the brazing components are suitable for brazing tubular shaped parts, whereas powder brazing alloys of the prior art are not easily used in that environment. In an exemplary embodiment of the method of the present invention, the solid brazing component is heated to a temperature less than 1410° F., by virtue of the alloy having a liquidus and/or MTA temperature below 1410° F. In a further exemplary embodiment of the present invention, the solid brazing component is heated to a temperature less than 1300° F., by virtue of the alloy having a liquidus and/or MTA temperature below 1300° F.

The alloys of the present invention, in their broadest form, consist essentially of at least copper, phosphorus, tin (and/or antimony) and nickel. Nickel, in combination with tin, achieves benefits to a degree not obtainable by the addition of either element alone to the phos-copper base alloys. Nickel, in combination with tin and optionally silicon, in the phos-copper and silver-phos-copper base alloys, is responsible for lowering the melting range of the brazing alloy, increasing corrosion-resistance, and smoothing the surface of the finished braze area. The hardness of the phos-copper base alloys may also be increased by nickel addition, particularly with respect to a constant phosphorus content.

However, if nickel content is increased while decreasing phosphorus content, a decrease in hardness may result. By way of example, an alloy of the present invention consisting essentially of 7.1% phosphorus, 6% tin, and 1-8% nickel, balance copper, tests to a Rockwell B hardness of 85-91, whereas the BCuP-2 alloy of the prior art (alloy 1 in the Table below) tests to a lower Rockwell B hardness of 78. The resultant brazes from alloys of the present invention are also ductile and strong. As with BCuP alloys of the prior art, it is important for the base metal to fail rather than the brazed joint. Several destructive tests on copper brazes made with Cu—P—Sn—Ni—Si alloys of the present invention conducted by the Edison Welding Institute did result in failure of the base metal, rather than the brazed joint. Moreover, compared to Cu—P and Cu—P—Ag alloys of the prior art, Cu—P—Sn—Ni and Cu—P—Ag—Sn—Ni alloys of the present invention exhibit lower liquidus, MTA and/or solidus temperatures and greater corrosion resistance thereby allowing brazing to take place within a lower temperature range and use to occur in more corrosive environments with longer joint life. Silicon addition to these alloys also creates the advantage of lowering the brazing temperature and surface tension when they are in the molten state. This allows the brazing alloys to better penetrate tightly fitting parts and to achieve fuller coverage of the surfaces to be brazed. For example, leaks in copper coils used in air conditioning systems are often caused by small voids within a braze, connecting with one another, to form a path wherein refrigerant gases escape.

Silicon additions in the presence of tin also offer the advantage of changing the color and texture of phos-copper base brazes from a dull, grainy, brown finish to a very smooth finish of bright tin or silver color. To achieve this color and texture change, these alloys require a tin or antimony content of not less than 0.1% and not greater than 10% individually or in combination. In particular, when added in the presence of tin (0.1% to 8.0%) and/or antimony (up to 4.0%), a color change is effected to a bright tin or silver color finish after brazing. Nickel addition increases the degree of this color change, in particular, the brightness. Silicon addition also increases the average tensile strength of phos-copper alloys.

Cooling curves run on a phos-copper BCuP-2 braze alloy (alloy 1), BCuP-4 braze alloy (alloy 2), and BCuP-5 braze alloy (alloy 3) of the prior art and phos-copper base alloys of the present invention containing tin and nickel additions with or without silicon and/or silver additions are analyzed and the results set forth the Table, showing solidus, MTA and liquidus temperatures. Minor thermal arrests often appear in the cooling curves but are not shown. All values are percents by weight.

| Alloy | % P | % Ag | % Sn | % Ni | % Si | Liquidus ° F. | MTA ° F. | Solidus ° F. |
|---|---|---|---|---|---|---|---|---|
| 1* | 7.1 | — | — | — | — | 1475 | — | 1310 |
| 2** | 7.2 | 6 | — | — | — | 1335 | 1246 | 1190 |
| 3*** | 5 | 15 | — | — | — | 1480 | 1194 | 1190 |
| 4 | 5 | 15 | 6 | 5 | 0.02 | 1343 | 1293 | 1037 |
| 5 | 5 | 15 | 6 | 5 | — | 1352 | 1211 | 1037 |
| 6 | 5 | 15 | 6 | 6 | 0.02 | 1352 | 1205 | 1038 |
| 7 | 5 | 15 | 6 | 7 | 0.02 | 1353 | 1251 | 1034 |
| 8 | 5 | 15 | 6 | 8 | 0.02 | 1384 | 1296 | 1034 |
| 9 | 5 | 15 | 6 | 6 | 0.015 | 1404 | 1212 | 1056 |
| 10 | 7 | 6 | 6 | 6 | 0.015 | 1240 | 1114 | 1037 |
| 11 | 5 | — | 6 | 6 | 0.015 | 1134 | — | 1134 |
| 12 | 7.1 | — | 6 | 1 | — | 1241 | — | 1241 |
| 13 | 7.1 | — | 6 | 3 | — | 1264 | 1210 | 1098 |
| 14 | 7.1 | — | 6 | 5 | — | 1290 | 1178 | 1116 |
| 15 | 7.1 | — | 6 | 8 | — | 1359 | 1133 | 1098 |

*Prior art phos-copper brazing alloy known as BCuP-2
**Prior art silver-phos-copper brazing alloy known as BCuP-4
***Prior art silver-phos-copper brazing alloy known as BCuP-5

The Table illustrates significant reductions in temperature across the melting range of the phos-copper base alloys of the present invention as compared with the BCuP-2 brazing alloy (alloy 1) of the prior art. Brazing temperatures for the phos-copper alloys with tin and nickel additions are significantly lower than the phos-copper BCuP-2 brazing alloys. The higher the nickel content, the lower the brazing temperature. The substantial reduction of required brazing temperatures effects considerable savings of both fuel gases and cycle time of brazing operations. The lower brazing temperatures also lessen the degree of annealing caused to parent copper and brass metals with the phos-copper base alloys. Such annealing causes the metal to soften and to become very weak. Also, in some very hot brazing furnaces, slight melting of the copper or brass base parts can occur.

A comparison of alloys 12-15 of the present invention show the effect of adding 6% tin in combination with 1-8% nickel to the BCuP-2 alloy. The combination of 6% tin and 1% nickel drops both the liquidus and solidus temperatures to 1241° F. As nickel content increases, the solidus temperature drops further, and the liquidus increases, but a MTA occurs, and brazing occurs at or near the MTA.

A comparison of alloy 11 of the present invention with the BCuP-2 alloy (alloy 1) of the prior art demonstrates the synergistic effect achieved by the addition of silicon, tin and nickel in accordance with the present invention. The BCuP-2 alloy does not exhibit a MTA, and so brazing occurs at or near the liquidus temperature of 1475° F. Addition of 6% tin in combination with 6% nickel and 0.015% silicon achieves a lowering of both the solidus and liquidus temperatures to 1134° F.

A reduction in brazing temperature is also generally apparent in the silver-phos-copper alloys containing tin and nickel, in particular those further containing silicon, and more in particular for those alloys containing about 6-15% silver. Alloy 10 of the present invention in comparison to the BCuP-4 alloy (alloy 2) demonstrates that the addition of tin, nickel and silicon lowers the MTA, solidus and liquidus temperatures of the brazing alloy. Alloys 4-9 of the present invention in comparison to the BCuP-5 alloy (alloy 3) further demonstrate a decrease in the liquidus and solidus temperatures while maintaining or slightly increasing the MTA temperature. In each of the alloys of the present invention, the liquidus temperature is below 1410° F. and the solidus temperature is below 1250° F. Many of the alloys also exhibit an MTA temperature less than 1300° F. Exemplary alloys of the present invention have a brazing temperature (MTA or liquidus temperature) below 1300° F., and advantageously, below 1250° F.

Figure 2:
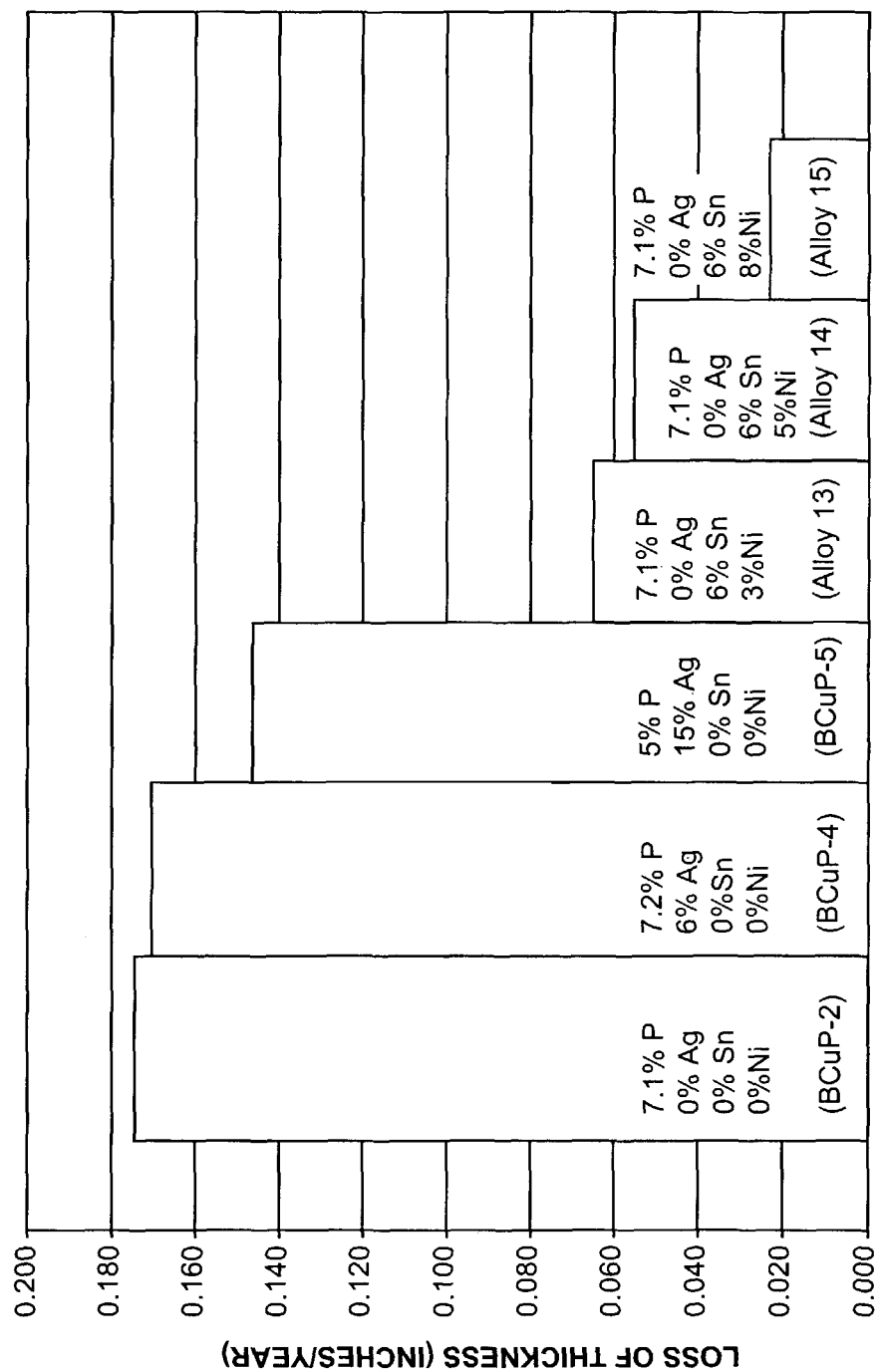
FIG. 2 is a graph depicting the improvement in corrosion resistance for phos-copper alloys of the present invention containing 3-8% nickel in combination with tin, as compared to BCuP alloys of the prior art.

FIGS. 1 and 2 visually demonstrate the synergistic effect of tin and nickel in the silver-phos-copper alloys and the phos-copper alloys. FIG. 1 depicts the corrosion resistance for silver phos-copper alloys of the present invention compared to the BCuP-5 alloy (alloy 3), and also to the BCuP-4 (alloy 2) and BCuP-2 (alloy 1) alloys. The graph includes data for alloy 4 and alloys similar to alloys 6-8 of the Table. It is noted that the silicon content varies from that listed for alloys 6-8 in the Table. Nonetheless, the alloys in FIG. 1 will be referred to as alloys 6-8. Alloys 4 and 6-8 are similar to BCuP-5, but modified with 6% tin; 5, 6, 7 and 8% nickel; and 0.02% silicon addition (or 0 or 0.015), i.e., Cu-5P-15Ag-6Sn-5-8Ni-0.02Si. To simulate a brazed joint in a corrosive environment, a sample of each of the braze alloys was agitated in a 10% HCl solution for 64 hours, and the weight loss measured. The results were extrapolated to predict the extent of corrosion after a period of one year. If a sample was made of a silver-phos-copper brazing material, the thickness of the sample would be reduced through corrosion by the amount shown in on year's time. It is noted, however, that each surface of the sample was exposed to acid in this test and thereby subject to corrosion, whereas only one surface of a braze is likely exposed in actual use. Therefore, the extent of corrosion is exaggerated in this test. Nonetheless, for purposes of comparison, if alloy 4 (5% Ni) were completely exposed to a 10% hydrochloric acid (HCl) solution for one year, the thickness of the braze would decrease by 0.127 inch. A braze of an alloy similar to alloy 8 (8% Ni) would decrease in thickness by 0.105 inch. So, the 8% Ni alloy 8 is about 17% more corrosion resistant than the 5% Ni alloy 4 when exposed to HCl. The BCuP-5 alloy would decrease in thickness by 0.147 inch, and thus, the 5% Ni alloy 4 is about 14% more corrosion resistant than BCuP-5 when exposed to HCl, and 8% Ni alloy 8 is about 29% more corrosion resistant than BCuP-5. FIG. 1 also compares the silver phos-copper alloys having 5-8% Ni to the BCuP-2 and BCuP-4 alloys of the prior art. In addition to the 14% improvement over BCuP-5, a braze of a BCuP-4 alloy would decrease in thickness by 0.17 inch, such that the 5% Ni alloy 4 is about 25% more corrosion resistant. A braze of a BCuP-2 alloy would decrease in thickness by 0.173 inch. So, the 5% Ni alloy 4 is about 27% more corrosion resistant than BCuP-2 when exposed to HCl.

FIG. 2 depicts the corrosion resistance for phos-copper alloys 13-15 of the present invention, as set forth in the Table, compared to the BCuP-2 alloy (alloy 1), as well as the BCuP-4 (alloy 2) and BCuP-5 (alloy 3) alloys, of the prior art. The 3% Ni alloy 13 would decrease in thickness by about 0.065 inch, and thus, is about 62% and 56% more corrosion resistant than BCuP-2 and BCuP-5, respectively, when exposed to HCl. The 8% Ni alloy 15 would decrease in thickness by about 0.023 inch, and thus, is about 87% and 84% more corrosion resistant than BCuP-2 and BCuP-5, respectively.

FIGS. 1 and 2 thus demonstrate that high nickel additions may be added to the silver-phos-copper base alloys and phos-copper base alloys when accompanied by tin to provide an alloy suitable for brazing that forms a smooth, solid, visually distinguishable brazed joint with significantly increased corrosion resistance.

The Table and Figures show meaningful reductions in liquidus, MTA and solidus temperatures and increases in corrosion resistance for the Cu—P—Sn—Ni and Cu—P—Sn—Ni—Si alloys of the present invention compared to the BCuP-2 alloy (alloy 1), and for the Cu—P—Ag—Sn—Ni—Si and Cu—P—Ag—Sn—Ni alloys of the present invention compared to the BCuP-4 (alloy 2) and BCuP-5 (alloy 3) alloys. Further, the brazed joints using alloys of the present invention have substantial raised shoulders or caps about the brazed joint which are visually distinguishable from adjacent copper and copper alloys. There is a further absence of black oxide, which can obscure the operator's view of the soundness of the joint. A synergistic effect is achieved with the combined additions of tin and nickel and with tin, nickel and silicon in both phos-copper and silver-phos-copper alloys.

While the present invention has been illustrated by the description of an embodiment thereof, and while the embodiment has been described in considerable detail, it is not intended to restrict or in any way limit the scope of the appended claims to such detail. Additional advantages and modifications will readily appear to those skilled in the art. The invention in its broader aspects is therefore not limited to the specific details, representative apparatus and method and illustrative examples shown and described. Accordingly, departures may be made from such details without departing from the scope or spirit of the general inventive concept.

What is claimed is:

1. A component for brazing without a flux, the component consists of, in weight percent:
    (a) about 6-7% phosphorus;
    (b) about 2-8% tin and about 2% antimony;
    (c) an amount of silicon, the amount of silicon ranging between a minimum and a maximum, the minimum being 0.1%, the maximum being about 3%;
    (d) up to about 3% nickel;
    (e) being without silver;
    (f) up to about 3% manganese; and
    the balance copper, the component having a liquidus temperature above 840° F. and being selected from the group consisting of: wire, strip, foil and preforms for brazing without a flux.

2. The component of claim 1 wherein the brazing component has a liquidus temperature less than about 1300° F. and a solidus temperature less than about 1200° F.

3. The component of claim 1 wherein the component exhibits a major thermal arrest at a temperature below about 1275° F.

4. The component of claim 1, wherein the component tests to a Rockwell B hardness in a range of 85-91.

* * * * *